United States Patent [19]

Martinez et al.

[11] Patent Number: 5,168,354
[45] Date of Patent: Dec. 1, 1992

[54] FAST FOOD DRIVE-THRU VIDEO COMMUNICATION SYSTEM

[75] Inventors: Juan R. Martinez, Miami; Miguel Suau, Pembroke Pines, both of Fla.

[73] Assignee: Burger King Corporation

[21] Appl. No.: 675,567

[22] Filed: Mar. 27, 1991

[51] Int. Cl.⁵ .......................... H04N 7/14; H04N 7/18
[52] U.S. Cl. ...................................... 358/93; 359/614; 358/108
[58] Field of Search ................. 358/93, 108, 252, 254, 358/255; 359/601, 602, 614

[56] References Cited

U.S. PATENT DOCUMENTS

| | | | |
|---|---|---|---|
| 2,819,459 | 1/1958 | Dodd | 358/252 |
| 2,912,066 | 11/1959 | Ellithorpe | 358/93 X |
| 3,001,015 | 9/1961 | Weiss | 359/601 X |
| 3,294,342 | 12/1966 | McClure et al. | 358/93 X |
| 3,804,504 | 4/1974 | Scott . | |
| 4,060,835 | 11/1977 | Gdovin . | |
| 4,084,194 | 4/1978 | Hector . | |
| 4,177,484 | 12/1979 | Boje . | |
| 4,355,329 | 10/1982 | Yoshida et al. . | |
| 4,675,515 | 6/1987 | Lucero . | |
| 4,821,118 | 4/1989 | Lafreniere . | |
| 4,865,420 | 9/1989 | Schmidt . | |
| 4,942,464 | 7/1990 | Milatz . | |
| 5,053,868 | 10/1991 | Higgins et al. | 358/93 |

FOREIGN PATENT DOCUMENTS

2-11082 1/1990 Japan .

*Primary Examiner*—James J. Groody
*Assistant Examiner*—Mark R. Powell
*Attorney, Agent, or Firm*—Arnold, White & Durkee

[57] ABSTRACT

A communication system as set forth which is particularly suitable for a fast food drive-thru restaurant by which the patron may maintain eye-to-eye visual contact with the attendant located within the restaurant while selecting his various food items. The system includes an attendant station in the restaurant having a video monitor positioned to project the image of the patron to the attendant. The attendant station also includes a video camera mounted at eye level elevation which picks up the eye level image of the attendant and transmits this image to a second video monitor located at a remote order station. A mirror is mounted within the attendant station which allows the attendant to view the attendant video monitor while simultaneously looking directly into the video camera. The remote order station, in addition to having the second video monitor which presents the eye level image of the attendant to the patron, includes a second video camera which observes the patron and transmits the patron's image to the attendant in the restaurant. The system may also include a glare baffle positioned in the remote order station adjacent to the video monitor which reduces the glare observed by the patron on the screen of the video monitor.

15 Claims, 4 Drawing Sheets

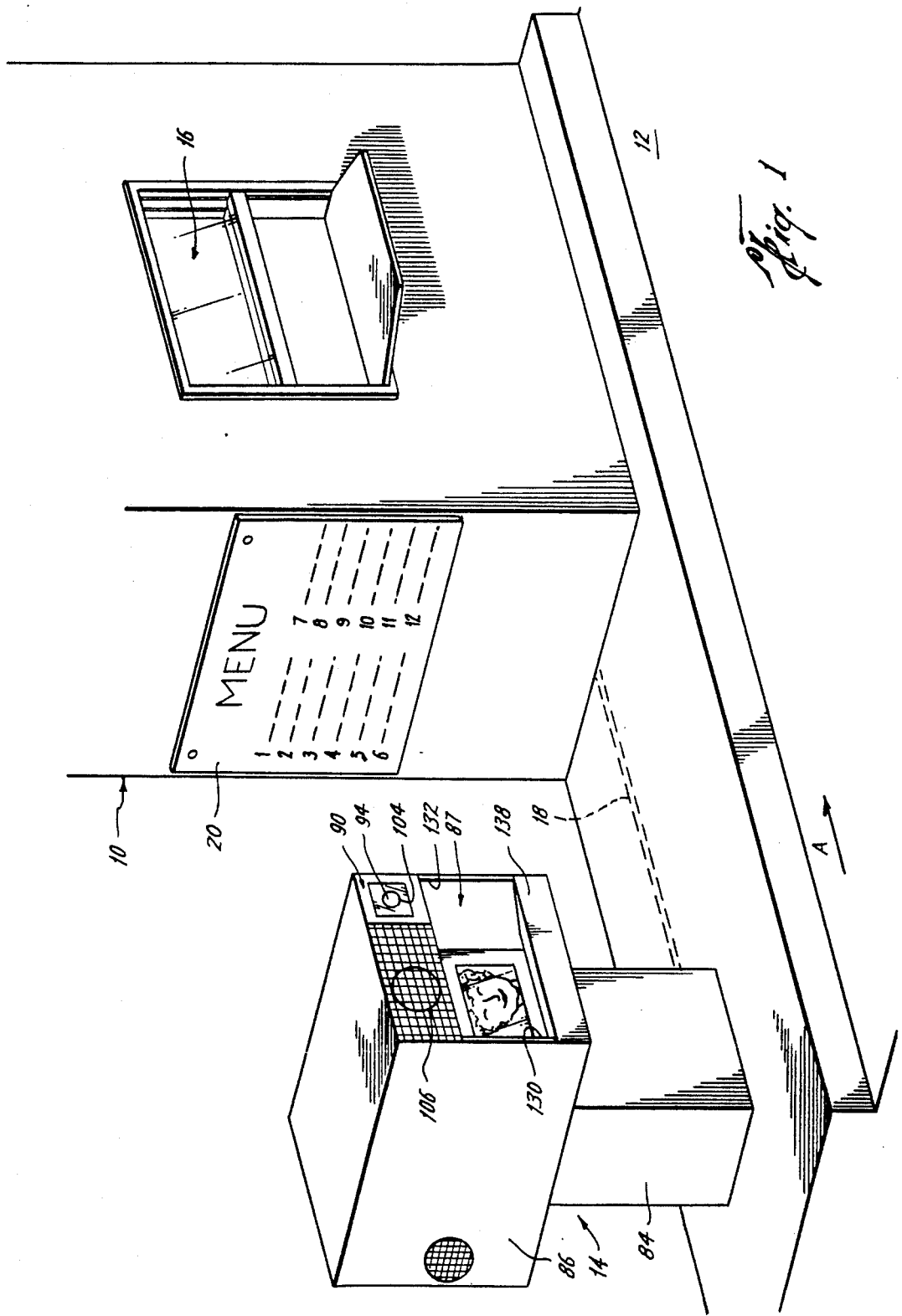

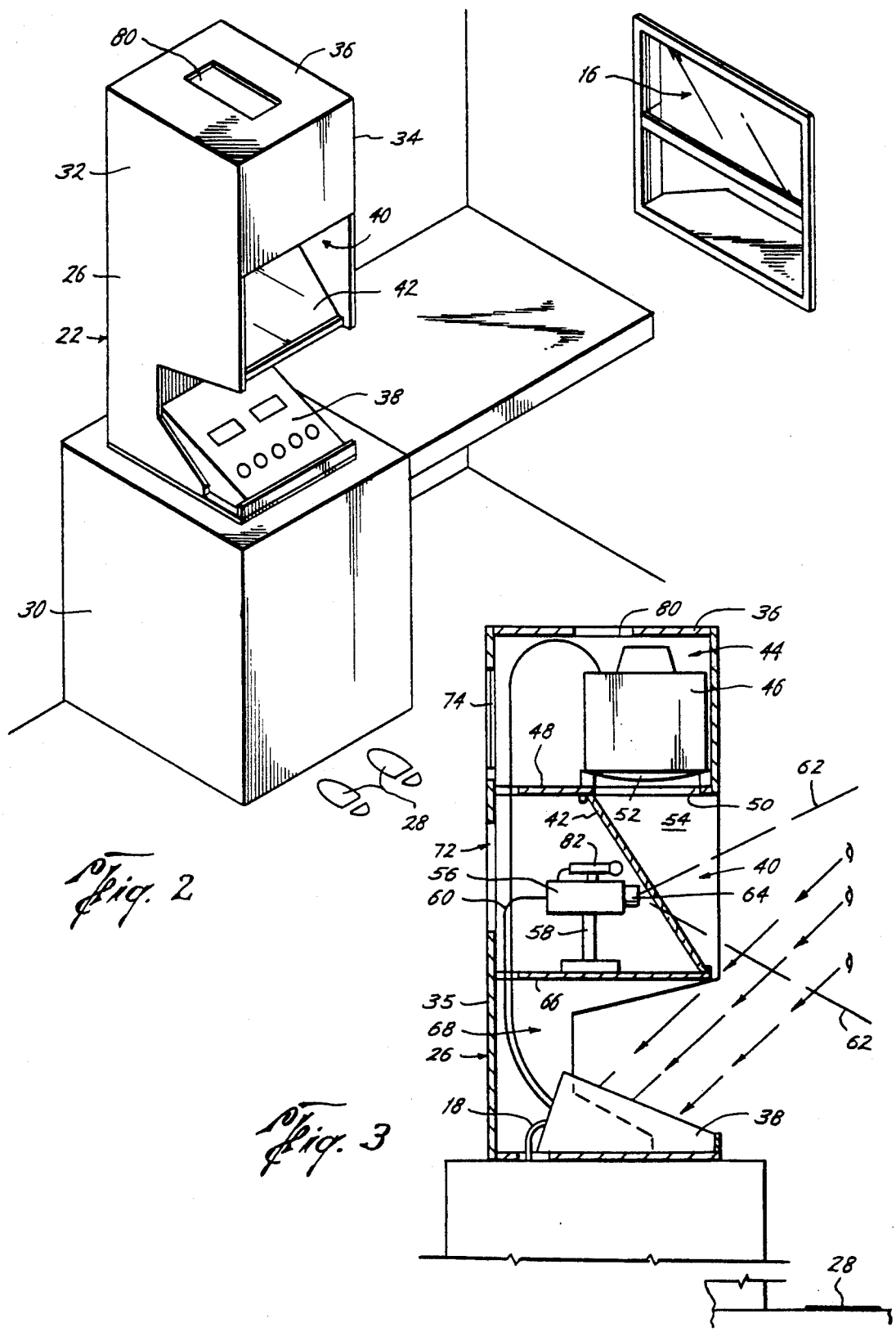

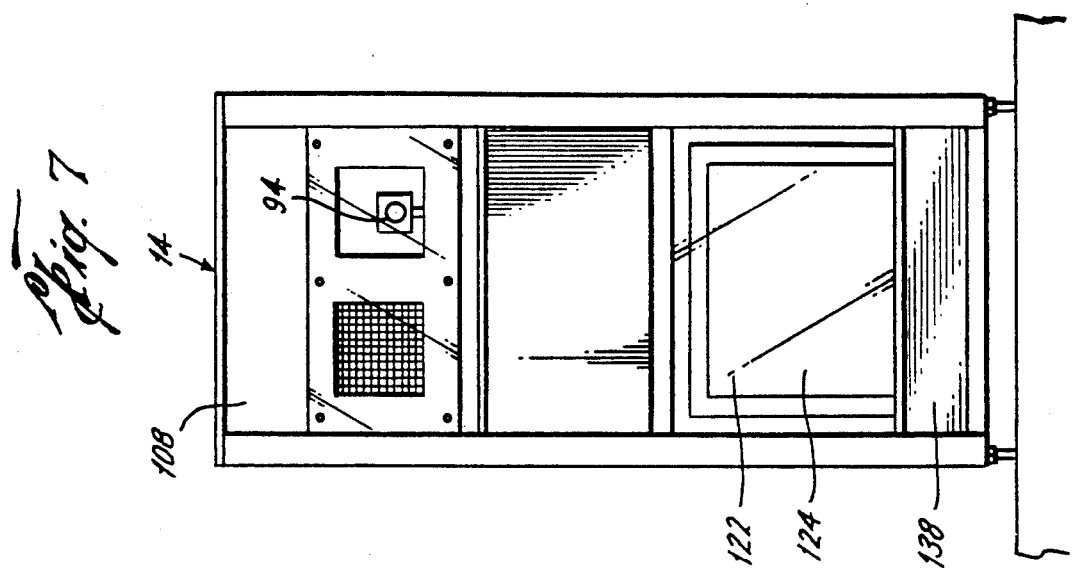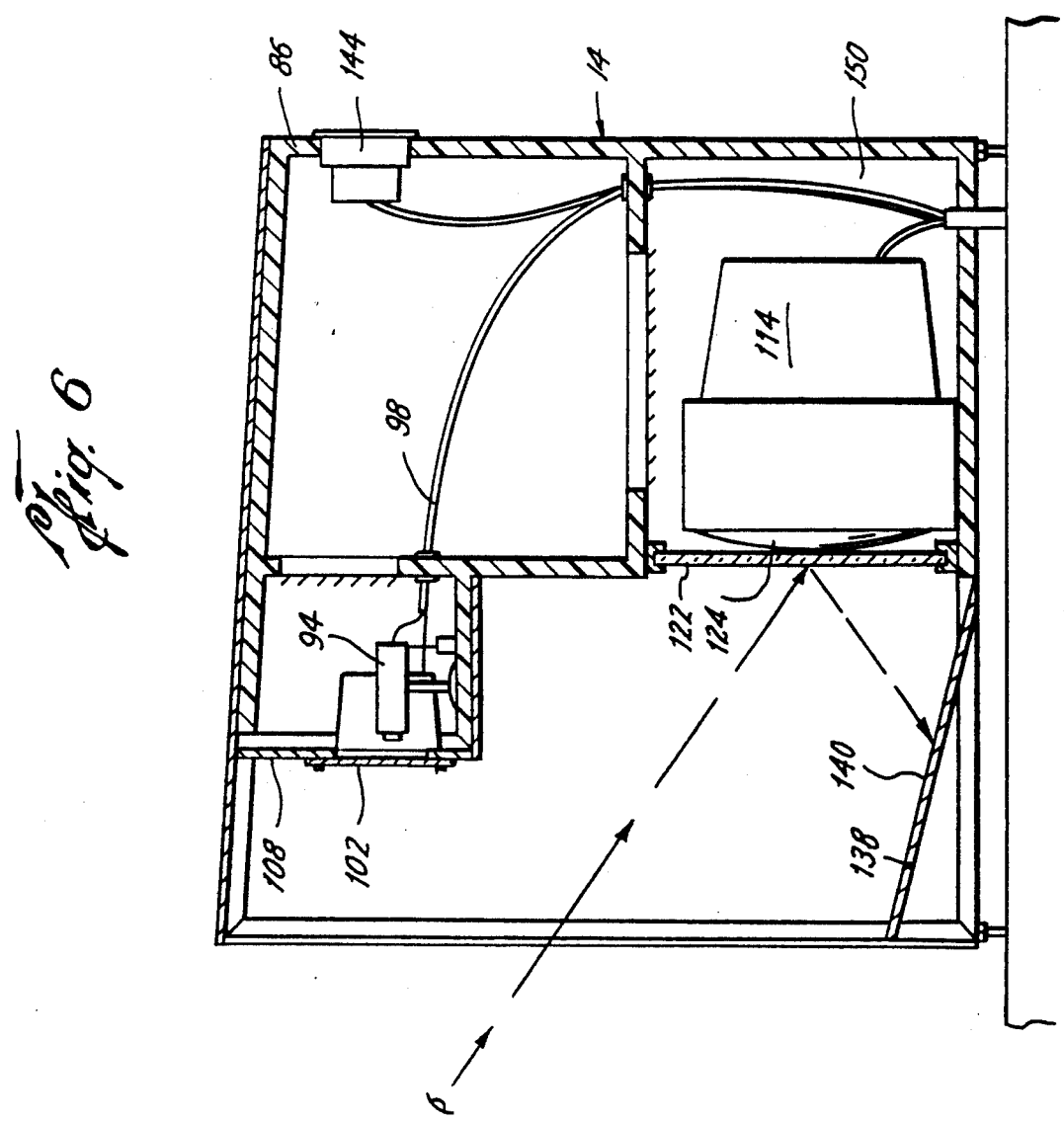

FAST FOOD DRIVE-THRU VIDEO COMMUNICATION SYSTEM

BACKGROUND OF THE INVENTION

1. Field of the Invention

The present invention generally relates to communications systems for use in a business establishment such as a fast food restaurant, which includes a drive-thru system and, in particular, to communication systems providing eye-to-eye visual contact and two-way audio communications between the patron and a restaurant employee.

2. Description of the Prior Art

Many business establishments and in particular fast food restaurants have for many years provided drive-thru service to its patrons. In such a restaurant, the patron typically drives his/her automobile through a designated traffic lane or drive running along at least one portion of the main restaurant building. Typically, such drive-thru systems include an order station located remotely from the building along the designated drive-thru lane. As the patron enters the drive-thru system along the designated path, the patron first encounters the order station located adjacent the traffic drive. There, the patron temporarily stops his or her vehicle adjacent to the order station in order to examine a menu board which displays the various food items offered by the restaurant. In many prior art systems, a two-way audio speaker device is located adjacent the menu at the order station and connected to a corresponding device in the restaurant which enables an employee or attendant of the restaurant, within the restaurant building, to communicate orally with the patron as the patron remains within his/her vehicle. Shortly after the patron has arrived at the order station, it is typical for the restaurant employee within the restaurant building to activate the two-way speaker in a manner so that the employee's voice is communicated to the order station and the patron so that the employee may assist the patron in the selection of the various food products. Additionally, the two-way audio system is such that the patron may then, by speaking into the two-way speaker device, communicate his or her food selection orally to the restaurant employee through the two-way speaker system. At that time, the restaurant employee, located within the restaurant building, records the selection of food items made by the patron at the end of the selection process. The employee then communicates the selection to the other restaurant employees where the various food items are prepared and/or collected. The patron then proceeds along the designated traffic drive to the restaurant building. Typically the restaurant building includes a pick-up window located immediately adjacent to the drive path. At the pick-up window, the patron halts his/her automobile, tenders payment for the food items, and receives the items. At that time, the patron then proceeds along the drive-thru path and exits the restaurant premises.

In a typical prior art drive-thru operation described above, the customer communicates only verbally to the attendant in making his/her selections and the attendant communicates only verbally to the patron in assisting the patron in its selection process as well as confirming the particular order of items.

Heretofore, one problem with prior art drive-thru systems has been the quality of the communication systems used at the order station and the restaurant building. In particular, many prior art systems have utilized a transceiver or two-way speaker system which enables only two-way verbal communication. These speaker systems often have been unreliable and poor in audio quality such that sufficient communication between the patron and the attendant is often difficult. These problems are often compounded by the environment in which the system is typically employed, as for example in high traffic areas where there is substantial background noise, both within and outside of the restaurant building. Additionally, since the order station is located remotely from the main building, weather conditions, patron abuse and vandalism often result in the equipment located at the remote station becoming damaged, inefficient or inoperable.

In the past, attempts have been made to improve drive-thru systems in general. For example, Lucero, U.S. Pat. No. 4,675,515, relates to an interactive system for menu selection and processing of said selection. The system of Lucero is particularly directed to a system where the patron may use a credit card at the remote station, make his food selection and obtain a voucher for signature at the pick-up window. The system does not appear to provide for both audio and video communications and particularly eye-to-eye video contact between the attendant and the patron.

U.S. Pat. No. 4,355,329 to Yoshida, while not directed to a drive-thru system, discloses a remote station for an interphone system. The station provides a video pick-up tube for observing the person appearing at the remote station, but it does not appear to provide for two-way video communication. It discloses the use of an interphone system to enable a two-way audio exchange between the remote station and a master station.

There has also been a continuing need within prior art drive-thru systems for overall improved communications between the patron and the attendant. In particular, the use of transceivers such as two-way audio speaker systems do not provide the patron with a feeling of personal attention and quality service often available within the restaurant. Since many of these prior art systems do not provide visual communication and in particular eye-to-eye visual communication together with verbal communication, the patron feels that he/she is not receiving adequate personal attention and service which discourages many patrons from using such a drive-thru system.

As can be appreciated, a more desirable and personal drive-thru system will tend to increase the usage of such a system at the restaurant, thereby increasing overall sales and profitability.

SUMMARY OF THE INVENTION

A primary feature of the present invention is to overcome many of the limitations and disadvantages of the prior art drive-thru communications systems.

A further feature of the present invention is to provide the design of a two-way audio and video communication system that may be placed in a drive-thru system used in restaurants as well as banks and other facilities utilizing a drive-thru design.

Another feature of the present invention is to provide a communication system for use in a business establishment such as a fast food restaurant, which includes a drive-thru system which provides eye-to-eye visual and audio communication between the patron and the restaurant employee or attendant.

An additional feature of the present invention is to provide a remote order station and an inside attendant station which utilizes a communication system capable of providing two-way, eye-to-eye visual, as well as audio, communication in an efficient and inexpensive manner.

Still another feature of the present invention is to design a remote order station for use in a drive-thru communication system that allows for the use of a video monitor or screen outdoors where often times lighting conditions are unfavorable resulting in surrounding light being reflected off the video screen (glare) thereby rendering the presentation on the video screen very difficult to view.

These and other feature are achieved by an improved communication system having an attendant console located within the restaurant, an order station located remotely from the restaurant and being operably connected to each other. The internal attendant station includes a cabinet or housing having a television monitor that is mounted in the upper portion of the cabinet for projecting its presentation in a generally vertical direction. The image on the screen or presentation of the monitor is then reflected horizontally at eye level out of the cabinet by a reflecting surface, such as a mirror, located at an angle with respect to the television monitor screen. The reflecting surface is located at approximately eye level of the attendant whereby the attendant may conveniently view the video monitor screen while operating the attendant station. Also located in the attendant cabinet is a video camera and sound pick-up system. This camera is also located approximately attendant eye level in the cabinet and positioned oppositely from the attendant and behind the angled reflective glass. The central portion of the reflective surface, located immediately adjacent to and aligned with the video camera is provided with a small transparent window or other means for allowing the video camera to monitor the field of vision immediately aligned with the central portion of the attendant cabinet. The attendant cabinet is connected through appropriate conduits to the remotely located order station. The order station also includes an order cabinet or housing. The housing includes a video chamber having a video monitor mounted therein. The monitor receives video signals from the camera in the attendant station and is located such that it is within the line of site of a patron located in their automobile adjacent to the remote station. An angled glare baffle is located adjacent to the lower portion of the monitor screen and substantially reduces the amount of surrounding light being reflected onto the monitor screen and back to the patron. The remote station cabinet also includes a camera chamber where a second video camera is positioned to observe the patron as he remains in his automobile. The image from the second camera of the patron is provided to the monitor located in the attendant station. The remote station also includes a communication link such as a microphone and speaker box assembly adapted for transmitting verbal communications between the patron and the attendant located within the building.

Additional features of the invention will appear from the following description in which the preferred embodiments have been set forth in detail in conjunction with the accompanying drawings.

BRIEF DESCRIPTION OF THE DRAWINGS

These and other features and advantages of the present invention will become appreciated as the same becomes better understood with reference to the specification, claims and drawings wherein:

FIG. 1 is a perspective view of a portion of a drive-thru establishment incorporating one embodiment of the system according to the present invention;

FIG. 2 is a perspective view of the attendant station and pick-up window of the present invention.

FIG. 3 is a side sectional view and schematically shows the arrangement of the video components of the station of FIG. 2.

FIG. 6 is a side sectional view and schematically shows the arrangement of the components of a third embodiment of the order station of the present invention.

FIG. 7 is a front elevation view of the embodiment of FIG. 6.

DETAILED DESCRIPTION OF THE INVENTION

Figure 4:
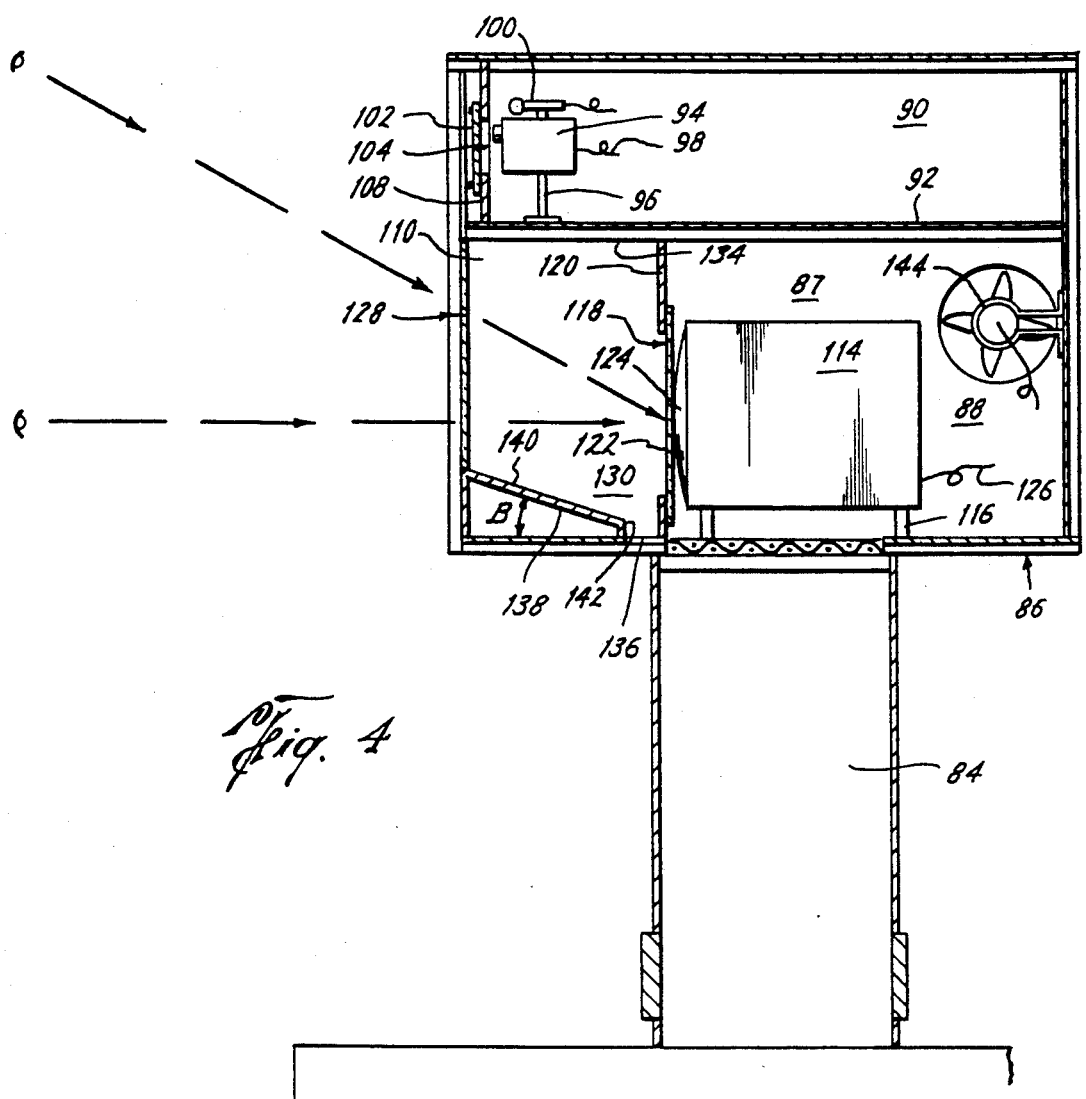
FIG. 4 is a side sectional view and schematically shows the arrangement of the internal components of the remote order station of the first embodiment of the present invention.

Turning first to the drawings, FIG. 1 shows generally an example of a business establishment, in this case a fast food restaurant, having a drive-thru system. The illustration and employment of the invention for a fast food drive-thru restaurant is merely by way of example and it should be understood that as hereinafter described the invention is equally useful in other business establishments such as banks having a drive-thru or walk-up service.

With specific reference to FIG. 1, the fast food establishment includes a main building 10 and a drive-thru system having a drive-thru path or lane 12 whereby customers may drive their car along lane 12 and through the premises. It should be understood that while a drive-thru system is described, the communication system could be used for "walk-up" customers also. The main building 10 typically houses kitchen facilities and personnel. As seen in FIG. 1, drive-thru lane 12 is located adjacent to building 10 whereby a motorist patron operates his vehicles along the drive-thru lane 12. At a location along the building 10, typically a pick-up window 16 is provided where the various items purchased by the customer are ultimately delivered directly to the customer while he remains in his vehicle. To facilitate the transfer of the various food items to the customers sitting in his vehicle, an employee or an attendant is typically positioned adjacent the pick-up window and inside building 10. Pick-up window 16 may also extend outwardly from building 10 to enable convenient transfer to the customer.

In order for the motorist/patron to utilize the drive-thru system, he typically enters the restaurant premises onto the drive-thru lane 12 in the direction shown by arrow A of FIG. 1. At a location remote from building 10, and located adjacent lane 12, a remote order station 14 is provided together with a menu display 20 which provides a list of the various food items offered by the restaurant with their corresponding price. The customer stops the vehicle in the drive-thru lane 12 adjacent to the remote order station 14, views the menu board 20 and makes selections therefrom. After the patron has decided upon which items he wishes to purchase, he then communicates his food order by utilizing the two-way audio and video communication system of the present invention as is hereinafter more fully described. After making the food selection and communicating the selection to the attendant located in building 10, the patron then proceeds along drive-thru lane 12 to pick-up window 16 where the various food items previously selected by the patron are provided to the patron while he remains in his vehicle. After paying for the food items, the patron then proceeds along drive-thru lane 12 and exits the restaurant premises.

Turning now to a more detailed description of the communication system, generally the system is a two-way audio and video communication system by which a drive-thru patron may communicate visually and audibly from the remote station 14 to an attendant located within building 10. In particular, the system includes an attendant station 22 (FIG. 2) positioned adjacent the pick-up window 16 within the establishment building 10. The attendant station 22 is connected through communication cables 18 or other appropriate signal carrying means to remote order station 14. In addition to two video communication circuits, to be described, the communication system further includes a two-way audio communication link connected between the attendant station 22 and the order station 14 through cables 18 whereby the attendant and the patron may talk with one another.

Turning now to FIG. 2, the attendant station 22 will be described in more detail. Station 22, as shown in FIG. 2, may include attendant housing cabinet 26 which may be positioned adjacent to pick-up window 16 within building 10. It is preferred that attendant station 22 be positioned in building 10 such that the attendant responsible for operating the drive-thru system stands immediately in front of station 22 in the location shown by footprints 28 facing attendant station 22 with pick-up window 16 being immediately to the attendant's right side as shown in FIG. 2. Such orientation enables the attendant to efficiently operate attendant station 22 while also conveniently located to service the patron after he has arrived at the pick-up window 16 to receive the food.

Attendant housing cabinet 26 is shown as being positioned on support base 30 although, as can be understood, cabinet 26 could be supported by other means such as attaching directly to the adjoining wall or extend downwardly and be of unitary construction resting directly upon the floor of building 10. Cabinet 26 is shown in FIG. 2 as consisting of two vertical sides 32, 34, back panel 35, and top segment 36. However, as can be understood, cabinet 26 serves as a convenient housing for components of this portion of the communication system and could be replaced by individual shelves or other supports which retain the components in the desired relationships as can be understood by one skilled in the art with the benefit of the subject disclosure.

Attendant station 22 may also include master control unit 38 positioned in the lower portion of cabinet 26 as shown in FIG. 2. Control unit 38 is conveniently located such that the attendant may have easy access to its front panel to control and adjust the operation of the communication system and, in particular, the video and audio components to be subsequently described. Master control unit 38 is connected through cables and other appropriate electrical conduits to the various components located in attendant station 22 and remote order station 14 as shown in FIG. 2. Alternatively, unit 38 may serve as a terminal for a sales processing system for entering the food order, communicating the order to the kitchen, or function simply as a cash register for sales to the customers with the video and audio components having independent controls located elsewhere.

Attendant station 22 further includes a central opening or window 40 located essentially at eye level elevation for the attendant standing at position 28. Central window 40 of cabinet 26 provides an opening to central section 54 for the attendant to view mirror 42 which is mounted within the station 22 and positioned for providing a video image of the patron as transmitted from the remote order station 14 as will be more fully described. As can be seen from FIG. 2, the image of the patron is presented to the attendant at eye level elevation thereby allowing the attendant to conveniently operate attendant station 22 while viewing the image of the patron on mirror 42 as shown in FIGS. 2 and 3.

Now turning to FIG. 3, a partial cross-section of the attendant station 22 is provided. As shown in this FIGURE, upper portion or chamber 44 of attendant station 22 is equipped with a first video monitor or television 46 mounted within chamber 44 and supported by video support shelf 48. Shelf 48 includes screen opening 50 aligned with video monitor 46 such that the screen 52 of monitor 46 faces vertically downwardly into the lower central section 54 of cabinet 26. Such an arrangement thereby allows the image or presentation appearing on screen 52 to be projected in a generally vertical direction shown in a downwardly direction in FIG. 3. Video monitor 46 is positioned within chamber 44 and aligned over opening 50 such that screen 52 is aligned vertically above mirror 42 positioned within central section 54 of cabinet 26. Mirror 42 is mounted within cabinet 26 between screen 52 and the operating attendant such that mirror 42 reflects the presentation on video screen 52 out of station cabinet 26 at eye level elevation toward the attendant as shown in FIG. 3. As can be understood, the angle of orientation of mirror 42 within section 54 may vary somewhat depending upon the particular size of monitor 46 and central opening 40. Also as can be understood by one skilled in the art after benefit of this disclosure, the angle of orientation of mirror 42 may be adjusted by suitable adjustment means located along the lower surface of video support shelf 48. As can be seen from FIG. 3, the above arrangement whereby video monitor 46 is positioned above mirror 42 and mirror 42 is angled appropriately, the image appearing on video monitor 46 is accurately and effectively made available to the attendant when the attendant occupies position 28 in FIG. 2.

As further shown in FIG. 3, central section 54 further includes video camera 56 mounted upon support 58 and connected through cables 60 to master control unit 38. Camera 56 is positioned and supported within central section 54 such that it is also mounted at eye level elevation and directed outwardly out window 40 toward position 28 for picking up the image of the attendant, preferably the face of the attendant, when the attendant occupies position 28. In FIG. 3, a typical field of vision of camera 56 is shown by lines 62 radiating from the camera lens 64. Since it is necessary that camera 56 be able to pick up the image of the attendant through mirror 42, mirror 42 may include a transparent window through which camera 56 may pick up the image of the attendant. While such a window may take several forms, it is contemplated that mirror 42 may be a reflective, one-way glass such that mirror 42 functions as a normal mirror reflective of screen 52 when viewed by the attendant while also functioning as a transparent glass when viewed from its opposite side where camera 56 is located as shown in FIG. 3. Alternatively, mirror 42 may take the form of a conventional mirror with an aperture or opening aligned with lens 64 such that the camera 56 may pick up the image of the attendant in position 28. As shown in FIG. 3, it can be appreciated that camera 56 and mirror 42 are both positioned at eye level elevation thereby enabling the attendant to observe the image presentation appearing on screen 52 while simultaneously looking directly into lens 64 of camera 56 thereby enabling camera 56 to pick up an image of the attendant's face as the attendant is looking directly at the reflected image of the patron. Such an arrangement presents an eye-to-eye type visual communication to the patron and its desirable feeling of personal attention.

As further shown in FIG. 3, camera 56 and support 58 are mounted on video support shelf 66 which also forms the upper portion of lower chamber 68 which houses unit 38 shown in FIG. 3. Cabinet 26 further includes rear wall 35 which provides support and rigidity to cabinet 26. Rear wall 35 further includes openings 72 and 74 which provide easy and convenient access to the components contained within chambers 44, 54. The embodiment shown in FIG. 3 may include doors (not shown) hinged to cabinet wall 35 but as can be understood other means for access to the various components may be used. Top surface 36 of cabinet 26 may also include opening 80 which provides ventilation for the various components as well as access to the chamber 44 if needed.

As can be appreciated by one skilled in the art with the benefit of this disclosure, the particular arrangements of the various components within cabinet 26 may be varied. For example, monitor 46 may be mounted in lower chamber 68 with screen 52 projecting upwardly. If such an arrangement is employed, then mirror 42 would be reversed to the angular orientation shown in FIG. 3 such that the image appearing on screen 52 would be projected upwardly as shown in FIG. 3 then out of cabinet 26 through opening 40. Such an arrangement would be consistent with the feature of providing a projected image at eye level elevation while also maintaining camera 56 at such an elevation.

Camera 56 is shown as including a sound receiving means such as a voice activated microphone 82 as a portion of camera 56. Alternatively, as can be understood, microphone 82 may be located at other convenient locations associated with attendant station 22 as, for example, extending outwardly from cabinet 26 toward the attendant without being connected by a cable to camera 56 and either voice activated or include an on/off switch. Alternatively, the attendant may be equipped with an appropriate headset device or transceiver unit connected to control unit 38. As can be understood, there are various microphone or transceiver devices which may be utilized with the present system and which cooperate with a transceiver located at the order station in order that a two-way audio communication link is provided which connects the attendant station with the order station whereby the attendant and the patron may talk with one another.

Turning now to FIGS. 1 and 4, one embodiment of remote order station 14 is shown. The embodiment of remote station 14 shown in FIG. 1 includes base section 84 and housing cabinet 86. Also shown in FIG. 1 as being located adjacent to station 14 is menu display 20 but as can be understood, the location of menu 20 is somewhat dependant upon the arrangement of the particular drive-thru system.

As shown in FIGS. 1 and 4, base 84 is constructed such that cabinet 86 is positioned at a height such that the central portion of cabinet 86 is at eye level elevation to a patron positioned adjacent station 14 and seated in the patron's vehicle. In other words, base 84 is sized such that a patron sitting in his vehicle may easily and conveniently look into the open, central portion of cabinet 86.

The embodiment of cabinet 86 shown in FIG. 1 includes lower video housing 87 and upper audio section or chamber 90. Referring now in particular to the cross-section shown in FIG. 4, video housing 87 is separated from upper audio section or chamber 90 by partition 92 which forms the bottom surface for chamber 90. As shown in FIG. 4, a second video camera 94 is positioned and mounted within chamber 90 of remote station 14. Camera 94 is mounted on support 96 in a manner such that camera 94 may be selectively positioned to observe and pick up the image of the patron in their vehicle as the vehicle is positioned in lane 12 adjacent station 14. Camera 94 receives the image of the patron in their vehicle, creates a video signal and transmits this signal through cables 98, 18 to control unit 38 and then to video monitor 46 for display to the attendant.

Also mounted within chamber 90 is a compatible transceiver assembly such as microphone 100 and an accompanying speaker (not shown). As can be understood, the microphone and speaker combination 100, 102 can be any type of comparable transceiver equipment compatible with the corresponding equipment utilized by the attendant in operation of the attendant station 22 such that the two-way audio communication link is maintained between the attendant station and the order station and allowing the attendant and patron to talk with one another. As shown in FIG. 1, camera 94 is positioned such that it observes the patron through aperture 104 with sound entering and leaving chamber 90 through gridded opening 106. As can be understood, aperture 104 may be protected by a transparent, non-glare material 102 mounted immediately in front of camera 94 and shown on wall 108 in FIG. 4.

Positioned below chamber 90 is video housing 87 having a substantially closed video chamber 88 and a substantially open front anti-glare portion or section 110. Video chamber 88 includes a second video monitor 114 supported by base 116. Monitor 114 is positioned and aligned with video window or opening 118 in vertical partition 120 separating chamber 110 and 88. Opening 118 in vertical partition 120 may be equipped with a transparent, non-glare coated glass 122. Positioned immediately adjacent to and within chamber 88, is screen 124 of monitor 114. It is also desirable that screen 124 be fabricated of an anti-glare glass such as, for example and without limitation, a flat tension screen with anti-glare glass presently manufactured by Zenith Corporation of Chicago, Illinois and designated as Model No. FTM 1490, NTSC compatible. Extending from monitor 114 are control cables 126 which may extend downwardly through pedestal 84 together with cables 98 from camera 94 to connect with cables 18 (shown in FIG. 1) to the attendant station 22 and control unit 38. Such a connection thereby enables camera 94 to provide a video signal to video monitor 46 as previously described. Such cable connections also allow video camera 56, located in attendant station 22, to provide an eye level video signal to monitor 114 thereby enabling the patron, sitting in his vehicle in front of remote station 14, to observe screen 124 and the image thereon of the attendant thereby enabling the patron to make eye-to-eye contact with the attendant at position 28 within the restaurant.

Returning back to FIG. 4, anti-glare section 110 is shown adjacent to chamber 88 and provides protection and anti-glare capabilities for screen 124. In particular, section 110 is open-ended by virtue of opening 128 which opens to the front portion of the station 14 thereby enabling the patron to look into cabinet 86, through window 118 and view the screen 124. Section 110 includes two sidewall sections 130, 132 (FIG. 1) and ceiling section 134 formed by the lower surface of partition 92 as shown in FIG. 4. The fourth or bottom section of chamber 110 is formed by a portion of bottom panel 136 of cabinet section 86. These sections 130, 132, 134 and 136 are connected to each other along adjacent edges to form an open-ended cover or hood structure extending outwardly from the outer periphery of wall 120 and window 128. Thus, section 110 provides cover or shade to the screen 124 while still allowing the patron to view screen 124.

Since remote station 14 is located outside and unprotected from bright sunlight or other light sources, glare on screen 124 caused by surrounding light striking screen 124 and reflecting back toward the patron, is a substantial problem. In order to reduce the glare created by such reflected light on screen 124, the internal surfaces of chamber 110 are made with an anti-glare surface such as, for example and without limitation, black non-glare paint.

In a further effort to reduce the glare problem, glare baffle 138 is provided in chamber 110. Glare baffle 138 is positioned adjacent the lower portion of video screen 124 of video monitor 114. Glare baffle 138 is adapted for reducing the glare observed by the patron from the video monitor screen 124 by providing an inclined or angled upper surface 140. As shown in cross-section in FIG. 4, upper surface 140 of glare baffle 138 is usually positioned at an upward angle B relative to a horizontal line perpendicular to screen surface 124 of monitor 114. Surface 140 extends from the lower portion of video window 128 downwardly and inwardly into chamber 110 until rear edge 142 of surface 140 is near to glass 122. Glare baffle surface 140 also extends laterally across the lower portion of window 128 such that surface 140 extends across the full width of window 128 and across the substantial width of screen 124 such that surrounding light is absorbed by surface 140 rather than being reflected toward window 118 and screen 124.

One particular embodiment of glare baffle 138 is shown in FIG. 4 and, as can be appreciated by one skilled in the art after the benefit of the teachings of this disclosure, baffle 138 may be adjusted with respect to angle B as well as its length and width to conform to and optimize its anti-glaring effect for a particular height of order station 14 as well as the specific geographic location and direction or when used in combination with a particular size and shape video monitor and chamber 110. Additionally, cabinet 86 may be rotatably mounted to support 84 to enable cabinet 86 to be rotated during the day or during the year to accommodate the changing sun position and angle to minimize glare.

Video chamber 88 may be further provided with an exhaust system for insuring that the preferred temperature and humidity is maintained within the chamber. In the embodiment shown in FIG. 4, an exhaust fan 144 is provided which may circulate air through the chamber when needed for cooling or heating. Although not shown in FIG. 4, it should be understood that the environmental conditions such as temperature and humidity maintained within stations 14, 22 may be provided by any conventional air conditioning system or other environmental control means such as heaters, fans, humidifiers, etc.

Figure 5:
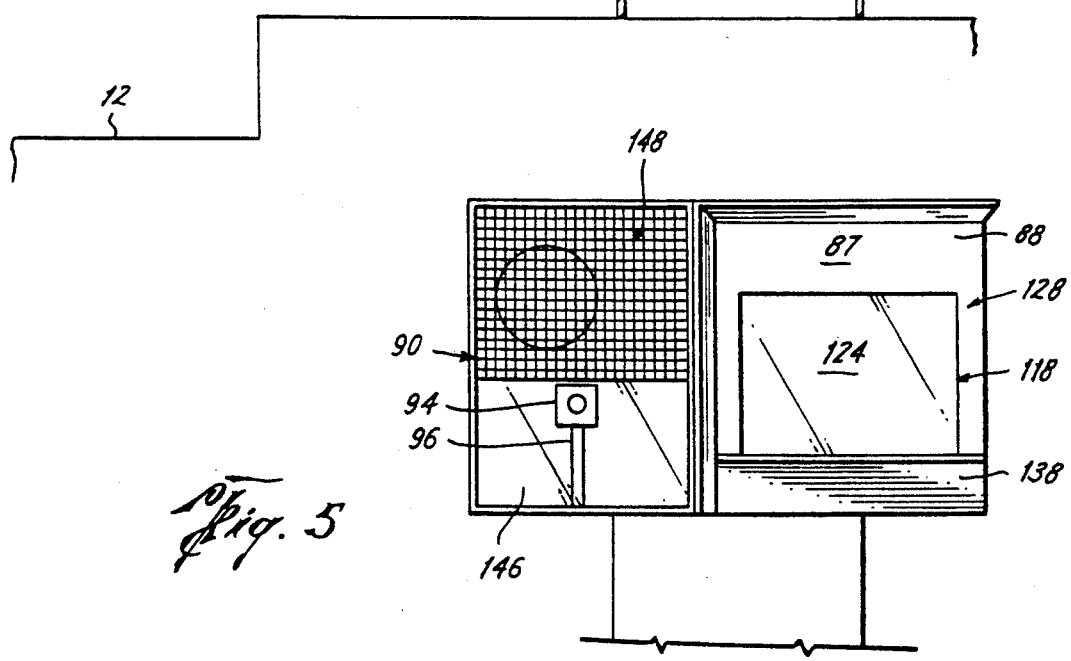
FIG. 5 is a front view of a second embodiment of the order station of the present invention.

Turning now to FIG. 5, an alternative embodiment of the remote order station is shown. FIG. 5 is a front view of this alternative embodiment similar to the embodiment of FIG. 4. In this second embodiment, video housing 87 and audio chamber 90 are constructed in a side-by-side relationship along the same elevation as compared to the vertical relationship shown in FIG. 4 with one chamber being above the other. As can be seen in FIG. 5, video chamber 88 includes glare baffle 138 positioned along the front portion of anti-glare section 110 with opening 128 allowing the patron to observe screen 124 through window 118 at eye level elevation.

Adjacent to housing 87 (shown to the left of opening 128 in FIG. 5), is audio chamber 90. The lower portion of 90 is shown as housing second video camera 94 on support 96. Camera 94 is selectively positioned and directed outwardly from chamber 90 toward the patron and may be protected by a transparent, anti-glare sheet 146. Positioned immediately above camera 94 is meshed opening 148 which contains the audio equipment such as a transceiver device having a speaker and microphone (not shown) as previously described.

Turning briefly to FIGS. 6 and 7, a still third embodiment of the remote station 14 is disclosed. FIG. 6 shows this embodiment in cross-section wherein second video monitor 114 is mounted in the lower portion of station 14 within chamber 150. The front wall of chamber 150 may consist of a transparent anti-glare glass 122 as previously described. Glare baffle 138 is shown located in the lower portion of cabinet 86 with upper surface 140 forming a non-reflective surface as previously described. In the embodiment of FIG. 6, second video camera 94 is shown mounted in a forward, third chamber together with a corresponding microphone and speaker assembly such that the camera remains positioned to observe the patron. As can be seen in FIGS. 6 and 7, the presentation of monitor 114 appearing on screen 124 can be observed by the patron from his vehicle by looking downwardly as shown in FIG. 6. Even through monitor 114 is not maintained at eye level elevation with the patron, the image or presentation of monitor 114 will be of the attendant's face and therefore the patron will retain the eye-to-eye contact impression with the attendant. It is believed that mounting the monitor 114 at a lower level might reduce glare in certain geographic locations and environments.

Turning now back to FIGS. 2 and 3, master control unit 38 is shown. It should be understood that control unit 38 has previously been described as functioning as a unit for controlling the communication system described herein. However, such a unit may include other control functions or useful instrumentation for the restaurant. For example, control unit 38 may also include a computer or cash register panel which provides the attendant a means for entering the patron's particular order into a central computer system which communicates such orders to the kitchen. Additionally, such a unit may provide payment processing capability such as retaining cash for accepting payment from the patron.

Alternatively, control of the various components such as the first and second video monitors and cameras may be accomplished through individual control switches located on the individual station cabinets.

As previously discussed, the two-way audio communication link connected between the attendant station and the order station which enables the attendant and the patron to talk with one another may take any of several embodiments. A microphone or transceiver unit may be conveniently operated independently of the video camera and monitor system and positioned in any convenient location such that the voice of the patron and attendant may be picked up and received by the audio system and communicated to a loud speaker located at the corresponding stations. Such microphone and loud speaker combinations may take any of several forms and may be located in a desirable location such that its function is effectively accomplished.

In the alternative, the audio portion of the present invention may be incorporated into the video equipment such as a typical television set contains its own loud speaker and many video cameras offered in the market today contain their own microphone. Such a sound system incorporated into the video equipment is also contemplated by the present invention.

Numerous alterations and alternatives of the structure herein disclosed will suggest themselves to those skilled in the art. However, it is to be understood that the present disclosure relates to a preferred embodiment or embodiments of the invention which is for purposes of illustration only and is not to be construed as a limitation of the invention and any such modifications or alterations which do not depart from the spirit and scope of the appended claims.

What is claimed is:

1. A two-way audio and video communication system for use in a drive-thru restaurant system by which a drive-thru patron remote from the restaurant building may communicate with an attendant located within the building, the communication system comprising:
   an attendant station positioned within the building;
   an order station positioned remote from the building;
   a first video circuit connected between the attendant station and the order station and adapted for picking up an eye level elevation image of the attendant at the attendant station and presenting said image to the patron at the order station;
   a second video circuit connected between the attendant station and the order station and adapted for picking up the image of the patron and presenting said image to the attendant while allowing the attendant to present the eye level elevation image to said first video circuit; and
   a two-way audio communication link connected between the attendant station and the order station whereby the attendant and patron may talk with one another.

2. The communication system as claimed in claim 1, wherein the first video circuit includes:
   first video camera mounted within the attendant station at eye level elevation, said camera positioned for picking up the eye level elevation image of the attendant and transmitting a video signal thereof; and
   first video monitor mounted within the order station and positioned such that the presentation thereon may be observed by the patron from their vehicle, said first video monitor adapted for receiving the video signal from the first video camera at the attendant station.

3. The communication system as claimed in claim 2 wherein the second video circuit includes:
   second video monitor mounted within the attendant station and positioned to project the presentation thereon in a generally vertical direction;
   second video camera mounted within the order station and positioned for picking up the image of the patron in their vehicle and transmitting a video signal thereof to the second video monitor at the attendant station; and
   mirror mounted within the attendant station and positioned for reflecting the presentation on the second video monitor out of the attendant station at eye level elevation toward the attendant.

4. The communication system of claim 3 wherein said mirror is mounted between the first video camera and the attendant and includes a transparent window through which the camera may pick up the eye level elevation image of the attendant.

5. The communication system as claimed in claim 2 further including a light absorbing glare baffle positioned adjacent the lower portion of the first video monitor and adapted for reducing the glare observed by the patron from the first video monitor.

6. The communication system as claimed in claim 5 wherein the glare baffle includes an upper light absorbing surface positioned at an upward angle relative to a substantially horizontal line substantially perpendicular to the screen surface of the first video monitor.

7. The communication system as claimed in claim 1, further including a master control unit at said attendant station, said unit operably connected to the first and second video circuits and the communication link to control the operation and use of the communication system.

8. A two-way audio and video communication system for use in a drive-thru establishment by which a drive-thru patron may communicate with an attendant located within the establishment, the communication system comprising:
   an attendant station positioned within the establishment, said station having;
      a first video monitor positioned to project the presentation thereon in a generally vertical direction:
      a first video camera mounted at substantially eye level elevation, said camera positioned for picking up an eye level image of the attendant and transmitting a video signal thereof;
      a mirror mounted between the camera and the attendant, and positioned for reflecting at eye level elevation the presentation on the first video monitor toward the attendant, said mirror including a transparent window through which the camera may pick up the eye level elevation image of the attendant;
   an order station positioned remote from the establishment, said station having;
      a second video monitor positioned such that the presentation thereon may be observed by the patron from their vehicle, said second video monitor adapted for receiving the video signal from the first video camera at the attendant station;

a second video camera positioned for picking up the image of the patron in their vehicle and transmitting a video signal thereof to the first video monitor of the attendant station; and a two-way audio communication link operably connected between the attendant station and the order station whereby the attendant and patron may talk with one another.

9. The communication system as claimed in claim 8 further including a light absorbing glare baffle positioned adjacent the lower portion of the second video monitor and adapted for reducing the glare observed by the patron as being from second video monitor.

10. The communication system as claimed in claim 9 wherein the glare baffle includes an upper light absorbing surface positioned at an upward angle relative to a substantially horizontal line substantially perpendicular to the screen surface of the second video monitor.

11. A two-way audio and video communication system for use in a drive-thru restaurant by which a drive-thru patron may communicate with an attendant located within the restaurant, the communication system comprising:

an attendant station positioned within the restaurant, said station having:

first video monitor mounted within the station and positioned to project the presentation thereon in a generally vertical direction:

first video camera mounted within the station at eye level elevation, said camera positioned for picking up the eye level elevation image of the attendant and transmitting a video signal thereof;

a mirror mounted within the station between said first camera and the attendant, and positioned for reflecting the presentation on the first video monitor out of the station at eye level elevation toward the attendant, said mirror having a port through which the camera may pick up the image of the attendant;

an order station positioned remote from the restaurant, said station having:

second video monitor mounted within the order station and positioned such that the presentation thereon may be observed by the patron from their vehicle, said second video monitor adapted for receiving the video signal from the first video camera of the attendant station;

glare baffle positioned adjacent the lower portion of the second video monitor and adapted for reducing the glare observed by the patron from the video monitor;

second video camera mounted within the order station and positioned for picking up the image of the patron in their vehicle and transmitting a video signal thereof to the first video monitor of the attendant station; and a two-way audio communication link connected between the attendant station and the order station whereby the attendant and patron may talk with one another.

12. The communication system as claimed in claim 11 wherein the glare baffle includes an upper light absorbing surface positioned at an upward angle relative to a substantially horizontal line substantially perpendicular to the screen surface of the second video monitor.

13. An order station for use by a patron of a drive-thru establishment, said station being remotely located from the establishment and comprising:

a cabinet housing having a video chamber and an open-ended, anti-glare section adjacent thereto;

a video monitor mounted within the video chamber and positioned such that the presentation thereon may be observed by the patron from a vehicle, said video monitor adapted for receiving a video signal from the establishment; and a light absorbing glare baffle positioned within the anti-glare section and adjacent the lower portion of the video monitor, said baffle adapted for reducing the glare observed by the patron from the video monitor.

14. An anti-glare cabinet for housing a video monitor to be observed by a patron-user, said cabinet comprising:

a video chamber for mounting said monitor, said chamber having a video window aligned with the screen of the monitor;

an anti-glare section attached to said video chamber, said anti-glare section having four sections connected to each other along adjacent edges to form an open-ended hood about the periphery of said video window whereby the video screen may be observed by the patron-user through the open portion of the anti-glare section; and a glare baffle positioned within the anti-glare section and adjacent the lower portion of the video window and having a light absorbing upper surface adapted for reducing the glare observed by the patron-user from the video monitor, said upper surface is positioned at an upward angle relative to a substantially horizontal line substantially perpendicular to the screen of the monitor.

15. An anti-glare cabinet for housing a video monitor, said cabinet comprising:

a cabinet enclosure having four panel sections connected to each other along adjacent edges to form an open-ended hood about the periphery of the screen of the video monitor; and a glare baffle positioned within the cabinet enclosure adjacent the lower portion of the video screen and having a light absorbing upper surface adapted for reducing the glare observed from the video screen, said upper surface is positioned at an upward angle relative to a substantially horizontal line substantially perpendicular to the screen of the monitor.

* * * * *